Patented Mar. 11, 1930

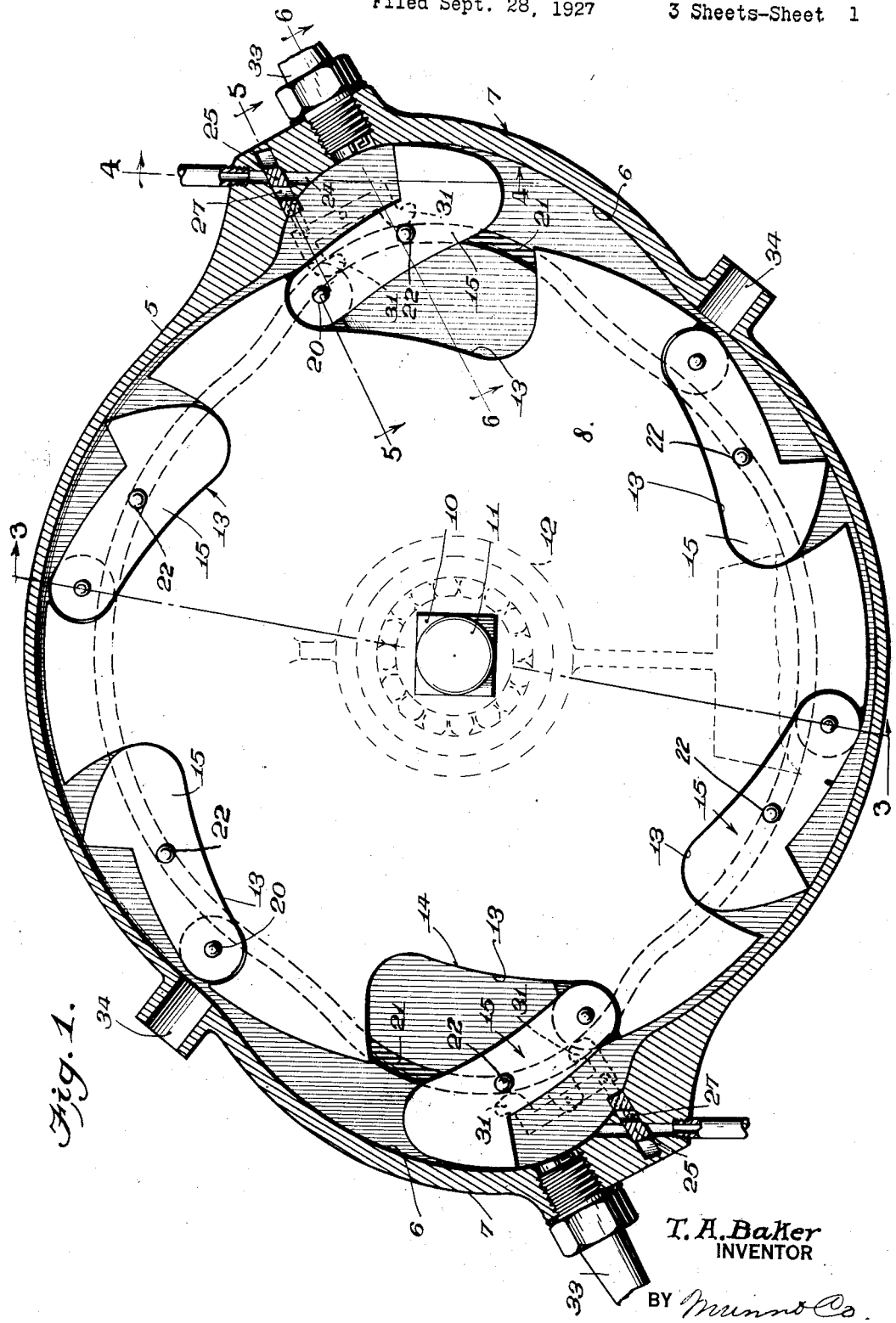

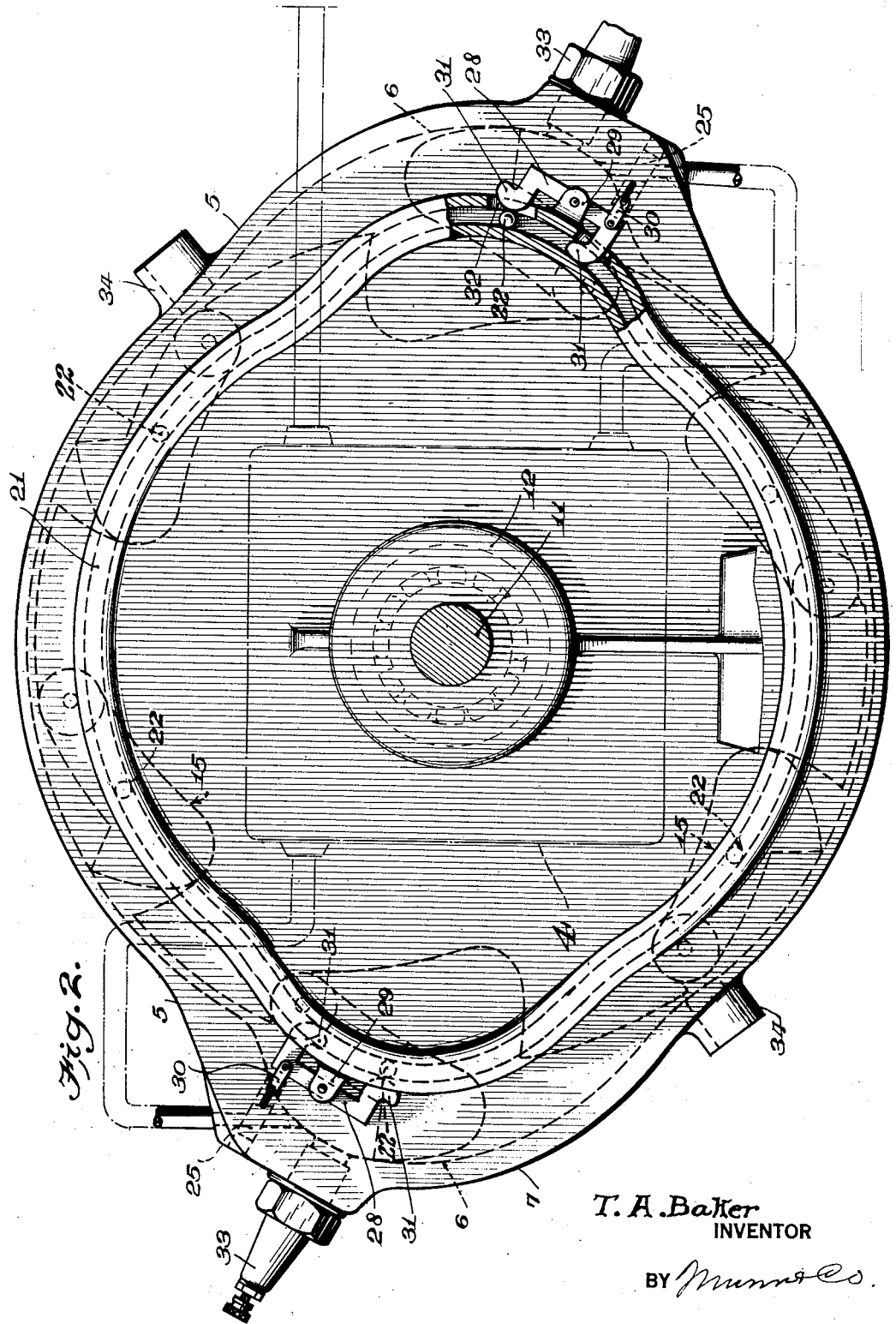

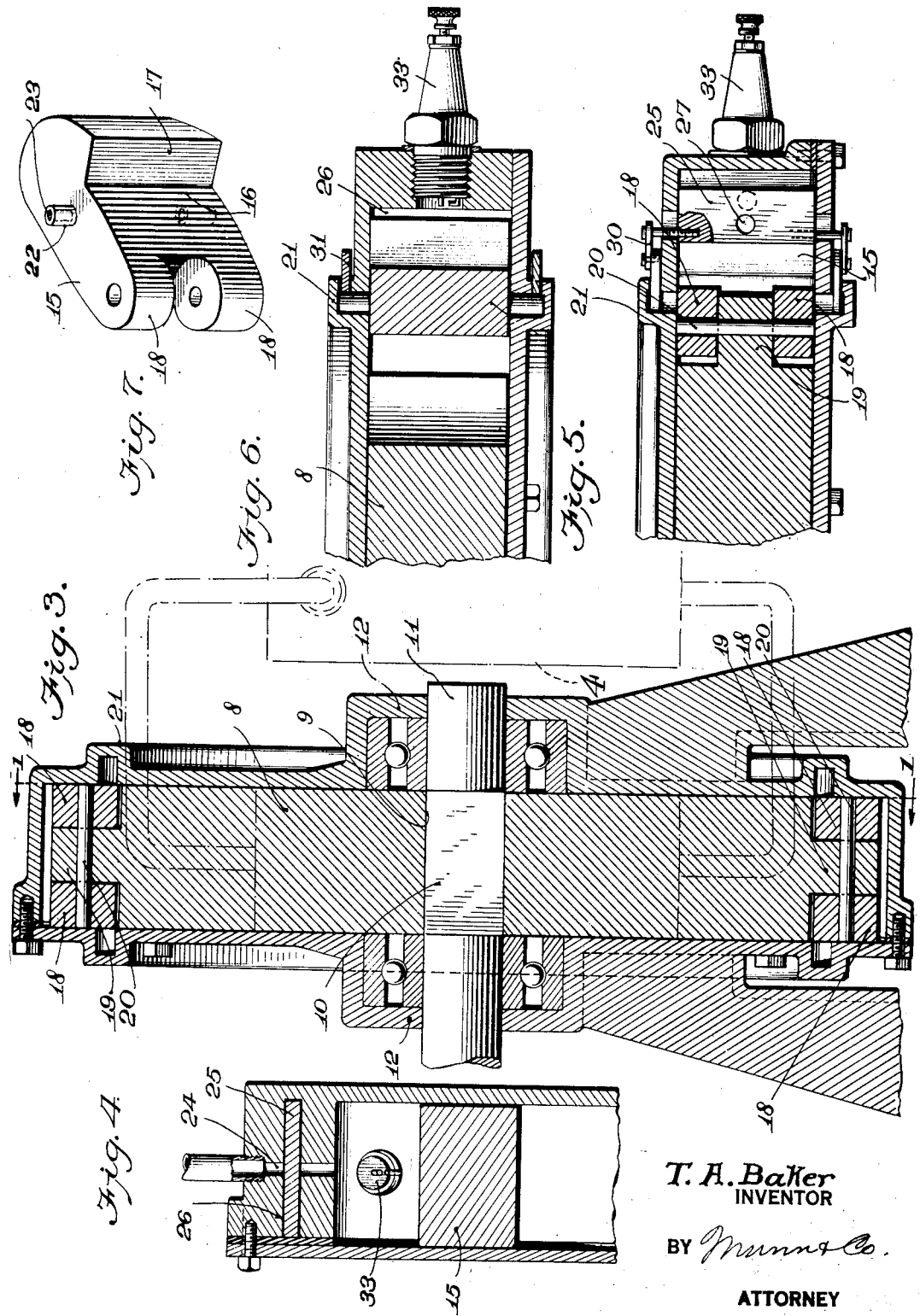

1,750,502

UNITED STATES PATENT OFFICE

THOMAS A. BAKER, OF BAKERSFIELD, CALIFORNIA

ROTARY INTERNAL-COMBUSTION ENGINE

Application filed September 28, 1927. Serial No. 222,600.

My invention relates to rotary internal combustion engines and an object of the invention resides in the provision of an internal combustion engine of this type which will utilize substantially all of the power of an exploded charge before the exhaust products are permitted to escape.

Another object of the invention is to provide a rotary internal combustion engine wherein carbon deposits are materially reduced if not wholly eliminated and which will develop a maximum horse power but will have a minimum gaseous fuel consumption.

Further the invention provides a rotary engine embodying an improved intake control valve and actuating mechanism which is smooth in operation, eliminates noise and improves generally motors of this type.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a vertical sectional view of my improved internal combustion engine on line 1—1 of Fig. 3;

Figure 2 is a side elevation of the same with parts broken away;

Figure 3 is a vertical sectional view taken on line 3—3 of Figure 1;

Figure 4 is a fragmentary sectional view taken on line 4—4 of Figure 1;

Figure 5 is a fragmentary sectional view on line 5—5 of Figure 1;

Figure 6 is a similar view on line 6—6 of Figure 1; and

Figure 7 is a perspective of one of the swinging vanes embodied in the invention.

Referring to the invention in detail a circular casing or shell 5 having combustion chambers 6 in the periphery thereof at diametrically opposite points is provided. These combustion chambers are offset outwardly beyond the circumference of the casing and their outer walls 7 are longitudinally curved and gradually merge into the peripheral wall of the casing.

A solid rotor 8 of a diameter and cross sectional area to be snugly received in the casing is provided, the latter having a central transverse rectangular opening 9 receiving a rectangular part 10 of a shaft 11 whose ends are journalled in bearings 12 formed with the casing at opposite sides thereof.

The rotor is formed with a plurality of spaced pockets or recesses 13 in its periphery. These pockets or recesses extend the entire width of the rotor and gradually increase in depth in the same direction toward one end thereof and their bottom walls are convex, as indicated at 14.

Swinging vanes or pistons 15 are provided to receive the force of the explosions in the combustion chambers to rotate the rotor. Each abutment consists of an elongated body or casting 16, shaped to normally lie within one of the pockets or recesses, and having a substantially triangular shaped projection 17 upon its forward end whose apex contacts with the peripheral walls of the casing and combustion chambers as they traverse the latter.

At its opposite end the bodies or castings are provided with a pair of perforated ears 18 which receive a forwardly extending perforated ear 19 formed with the rotor at the rear end of the recesses or pockets. A pivot pin 20 extends through the coinciding ears 18 and 19 to hingedly connect the abutments to the rotor.

Normally the vanes lie within the recesses or pockets in the periphery of the rotor until they reach the combustion chambers. As they successively reach these chambers they are swung away from the rotor and into the adjacent chamber to confine the charge and receive the impact as the former is exploded. For the purpose of actuating these vanes or pistons to operative and inoperative positions, eccentric tracks or grooves 21 are formed with the side walls of the shell or casing. Rollers 22, mounted on laterally projecting pins 23 carried by each vane and are received in these tracks and traverse the same incident to the rotation of the rotor.

An intake port 24 is provided in the forward end of each of the explosion chambers which are controlled by slide valves 25 movable in guides or recesses 26 intersecting the intake ports. These intake ports communicate with supply pipes 3 leading from a tank 4 containing explosive mixture under pressure. Normally the valves are in a position where these ports 27 do not register with the intake ports, but are periodically actuated to cause these ports to register to permit a charge under pressure to enter one of the explosion chambers.

To actuate these valves an inverted U-shaped lever 28 is pivotally attached intermediate its ends to ears 29 projecting from the eccentric track or groove in the zone of the forward ends of the explosion chambers which have one end connected to the valves through the medium of links 30.

These levers terminate in laterally extending parallel rounded enlargements 31 movable through openings 32 in the tracks or grooves, and are successively engaged by the rollers as they approach the explosion chambers to alternately open and close the valves.

Spark plugs 33 are arranged in each of the combustion chambers which may be connected with any well known ignition system to fire at the requisite time. An exhaust outlet 34 is provided in the peripheral wall of the casing in advance of the combustion chambers.

*Operation*

The rotor having been initially rotated manually or by any well known suitable mechanism, the lateral pins of a pair of the vanes that are now slightly in advance of the combustion chambers, engage the adjacent rounded enlargement of the inverted U-shaped levers to rock the latter to a position to move the slide valves to open position and at the same time project the rounded enlargements at the opposite end of each of the U-shaped levers, permitting the charge under pressure to enter each of the combustion chambers. The continued movement of the rotor causes the pins to engage the rounded enlargements now in their path, returning the U-shaped levers and coinciding valves to closed position. The charge in each combustion chamber, being confined between the vanes lying within the combustion chambers and walls of the latter, is ignited to impel these vanes in a clockwise direction to rotate the rotor. As the vanes move away from the combustion chambers their lateral pins move in the eccentric track-ways swinging the former into the pockets or recesses in the periphery of the rotor. This operation is continuously repeated, the pistons successively lying within the explosion chambers until they have moved the entire length of the latter.

What is claimed is:

1. In a rotary internal combustion engine, a casing, having combustion chambers therein, a rotor in the casing, a plurality of vanes carried by the rotor to receive the impact of the explosions occurring in the combustion chambers as the vanes successively reach the chambers, means for controlling the admission of explosion mixture to the combustion chambers, means for actuating the vanes successively into the combustion chambers as they approach the latter and moving them out of such chambers as they reach the ends of the latter, and intake valves operable to open and closed position by the vane actuating means.

2. In an internal combustion engine, a circular casing having a plurality of combustion chambers therein, a rotor journalled in the casing and having a plurality of spaced circumferential pockets therein, a swinging vane pivoted in each of the pockets, means for successively moving the vanes into the combustion chambers and returning them to their pockets, a U-shaped lever pivotally mounted adjacent each combustion chamber, a slide valve connected with each U-shaped lever and controlling the admission of gaseous fuel to the combustion chambers, and means carried by the rotor for engaging the legs of the U-shaped levers to alternately open and close each valve as the vanes assume operative and inoperative positions.

3. In an internal combustion engine, a circular casing having a plurality of combustion chambers therein, a rotor journalled in the casing and having a plurality of spaced circumferential pockets therein, a swinging vane pivoted in each of the pockets and normally lying therein but successively movable into the combustion chambers, a U-shaped lever pivotally mounted adjacent each combustion chamber, a valve connected with each U-shaped lever and controlling the admission of gaseous fuel to the combustion chambers, and means carried by the rotor for engaging the legs of the U-shaped levers to alternately open and close the valves as the vanes assume operative and inoperative positions.

THOMAS A. BAKER.